United States Patent [19]

Holz

[11] Patent Number: 4,612,683
[45] Date of Patent: Sep. 23, 1986

[54] APPARATUS FOR PRESSURE-TREATING MEAT

[75] Inventor: Ernst Holz, Heidenheim, Fed. Rep. of Germany

[73] Assignee: Holac Maschinenbau GmbH, Heidenheim, Fed. Rep. of Germany

[21] Appl. No.: 724,619

[22] Filed: Apr. 18, 1985

[30] Foreign Application Priority Data

May 21, 1984 [DE] Fed. Rep. of Germany ....... 3418850

[51] Int. Cl.$^4$ ............................ A22C 9/00; A22C 7/00
[52] U.S. Cl. ......................................... 17/26; 100/176; 100/910
[58] Field of Search ................... 17/25, 26, 27, 28, 29; 29/121.5; 100/155 R, 176; 403/260, 262, 336, 337; 130/5 J

[56] References Cited

U.S. PATENT DOCUMENTS

| | | | |
|---|---|---|---|
| 1,600,002 | 9/1926 | Kingery | 17/26 |
| 1,635,569 | 7/1927 | Ayars | 130/5 J |
| 1,982,487 | 11/1934 | Swift | 17/26 |
| 3,328,058 | 6/1967 | Gundlach | 403/336 |
| 4,360,952 | 11/1982 | Sampson | 17/26 X |

*Primary Examiner*—Willie G. Abercrombie
*Attorney, Agent, or Firm*—Walter H. Schneider

[57] ABSTRACT

An apparatus for pressure-treating meat, in particular uncooked ham before pickling brine is introduced, is provided with two opposed, rotating pressure rollers supported in a housing, which are provided on their jacket face with protrusions, teeth or studs or ribs extending along or obliquely with respect to the jacket lines. The grooves located between the studs are embodied in gabled fashion, as seen in cross section, on at least one of the pressure rollers. The circumferential circle through the tips of the gables of the grooves may be smaller by 0.5–5 mm, and preferably 1–2 mm, than the circumferential circle around the studs.

8 Claims, 6 Drawing Figures

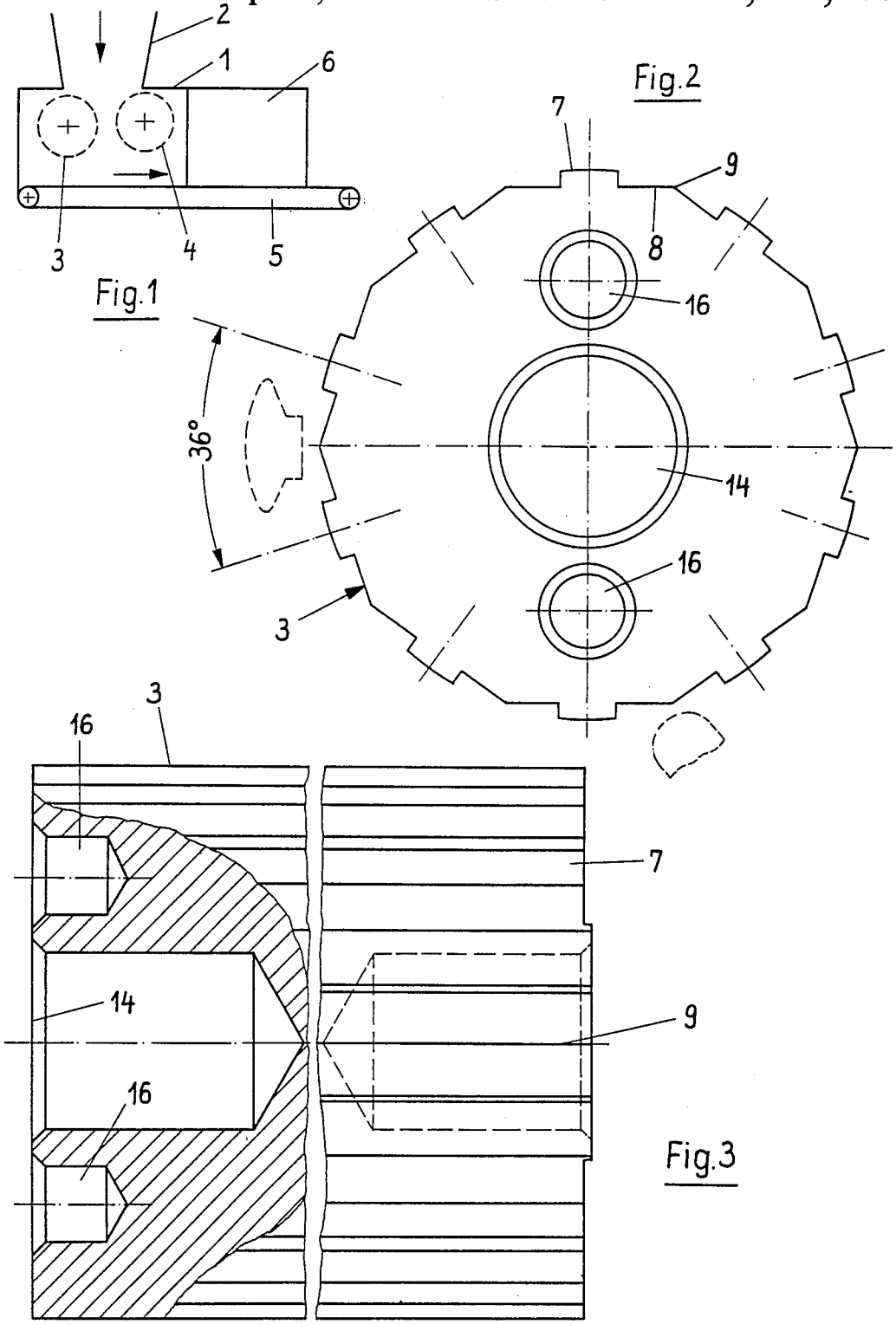

APPARATUS FOR PRESSURE-TREATING MEAT

FIELD OF THE INVENTION

The invention relates to an apparatus for pressure treating meat, in particular uncooked ham, before introducing curing, pickling or sousing brine. The apparatus has two opposed, rotating pressure rollers supported in a housing, which are provided on their jacket faces with protrusions, teeth or studs or ribs which extend along the jacket lines or obliquely thereto and have grooves disposed between them.

BACKGROUND OF THE INVENTION

An apparatus of this kind is known, for instance from German Pat. No. 30 02 636. To this end, it serves to tear open the meat tissue and open up the meat cells so that the pickling brine can enter them more easily. In particular, this pressure treatment is intended to open up the protein cells, in which the pickling brine is bound.

In German Pat. No. 30 02 636, a pair of pressure rollers is used for pressure treatment; one pressure roller is provided with studs extending along the jacket lines, while the other roller, as the transporting roller, has a smooth surface. Other forms of surfaces are also known, however, such as those having protrusions, teeth, knives, needles and the like; all of them have the task of increasing the surface area of the meat that is to be treated and opening up the cells.

These known pressure rollers function more or less satisfactorily; however, either the increase in surface area that is effected is not very great, or the meat is torn up so coarsely—that is, such deep cuts are made—that air is trapped in the meat. This trapped air, however, provides a fertile field for bacteria, and the meat becomes considerably more perishable.

SUMMARY OF THE INVENTION

It is accordingly the principal object of the present invention to devise an apparatus of the above generic type with which a considerable increase in surface area and good opening up of the meat or protein cells is attained, without cutting too deeply into the meat.

In accordance with the invention, this object is attained in that on at least one of the pressure rollers, the grooves are embodied in a gabled, or double-pitch manner, as viewed in the cross section of the pressure roller.

As a result of the embodiment of the grooves in accordance with the invention, excessive crushing of the meat cannot occur despite the application of great pressure. If the meat is pressed by the counterpressure roller, which generally cooperates in a toothed manner with the other pressure roller, into the grooves of the other pressure roller by means of the stud, ribs, protrusions or the like of the counterpressure roller, the gabled shape of the groove permits the meat to yield to the side, resulting in a certain relief of pressure. At the same time, however, an increase in the surface area of the meat is still attained thereby. Tests have shown that deep cuts are not produced in the meat, so that virtually no air is trapped in it. In a suitable combination of the two pressure rollers, the squeezing or massaging time in a following container that is required after an injection of pickling brine can be reduced by approximately 50–80%.

It has also been found that in comparison to the sequence described in German Pat. No. 30 02 636, according to which pickling brine is injected first and the pressure treatment is effected subsequently, it is generally more advantageous to perform these steps in the reverse order. As a result of a preliminary pressure treatment, the protein cells are opened up to receive the pickling brine and are therefore capable of receiving considerable quantities, while if the order is reversed there is the danger that the previously injected pickling brine will be squeezed out again. Naturally, however, the apparatus according to the invention can also be used in the order described in German Pat. No. 30 02 636.

It has been ascertained that it is not necessary for the grooves to be very deep. Quite the contrary, the best results have been attained if the circle of circumference through the tips of the gables of the grooves has a radius smaller by 0.5–5 mm than that of the circle of circumference about the studs. The best results have been attained with radii that were smaller by only 1–2 mm.

It has also be determined that the influence of the number of studs distributed over the circumference has great significance.

Depending on the diameter of the pressure roller, generally from 8–12 and preferably 10 studs are distributed over the jacket surface, extending parallel to the jacket lines.

The height and shape of the studs are also critical to the results obtained. The studs may be from 3–10 and preferably 5 mm high, and on at least one of the pressure rollers they are at least nearly rectangular or rhomboid in cross section. A different embodiment of the stud shape may be provided in that they have a semicircular shape or are rounded off, at least in their outer portions.

It has been found that very good results are obtained if the studs are rectangular or rhomboid, with gabled grooves between them, on one of the pressure rollers, while on the other pressure roller the studs have a semicircular shape or are rounded off. This combination of pressure rollers is particularly well suited for the treatment of uncooked ham. The rectangular or rhomboid studs assure an appropriate increase in surface area, and the rounded studs serve to relieve the meat or muscle tissue.

Good results have also been obtained when on at least one of the pressure rollers a multiplicity of pyramidal protrusions are distributed over the jacket surface, while the other pressure roller can then be provided with studs of rectangular or rhomboid shape with gabled grooves disposed between them, or may be semicircular or rounded in shape.

This roller combination is also very well suited to treating uncooked ham; the roller having the pyramid-shaped protrusions serves to increase the surface area of the meat, and the studded roller can relax the muscle tissue and open up the protein cells.

However, it is also within the scope of the present invention to combine two pressure rollers having pyramidal protrusions. This embodiment is selected if steaks or cutlets are to be treated; for treating steaks, pressure rollers with relatively larger pyramidal protrusions are used, while to treat cutlets, corresponding pressure rollers with relatively smaller pyramidal protrusions are selected.

Naturally instead of only two opposed pressure rollers, two pairs of pressure rollers may also be used within the scope of the invention, that is, a total of four pressure rollers disposed in pairs one after the other. In this case, the first pair of pressure rollers will effect the enlargement of the surface area and the opening up of the protein cells, while the second pressure roller pair will serve to relax the meat or muscle tissue.

To enable very broad application of the apparatus according to the invention, it is advantageous for the pressure rollers to be provided with a quick-closing means by way of which they are supported in the housing. As a result, the pressure rollers can be changed very quickly and easily, and various kinds of meat can be processed in optimal fashion, using only a single apparatus.

In one possible embodiment of the quick-closing means, a coupler disk is connected to a drive shaft of a drive apparatus and has a bearing trunnion which is inserted into a central bore of the pressure roller; bores which are in alignment with one another are disposed in an end face of the coupler disk and the pressure roller, and driver means are inserted through these bores.

The invention will become more apparent from the ensuing detailed description of exemplary embodiments thereof, taken in conjunction with the drawings.

BRIEF DESCRIPTION OF THE DRAWINGS

FIG. 1 is a basic illustration of the apparatus according to the invention;

FIG. 2 is an end view of a pressure roller according to the invention;

FIG. 3 is a side view of the pressure roller of FIG. 2, seen partially in section;

DESCRIPTION OF THE PREFERRED EMBODIMENTS

Figure 4:
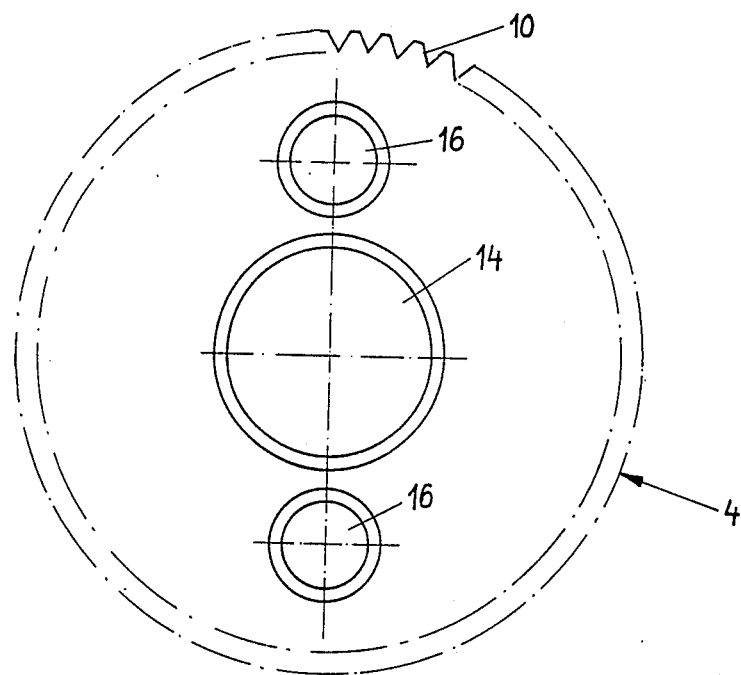
FIG. 4 is an end view of a pressure roller of a different shape.
Figure 6:
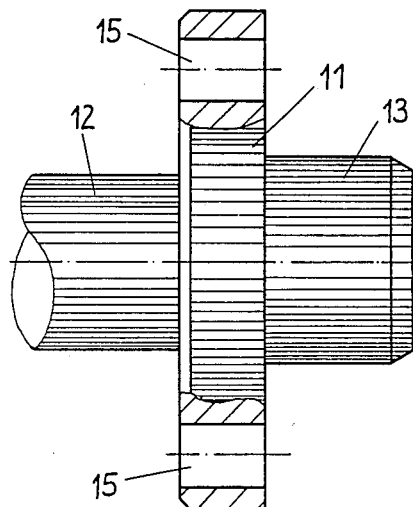
FIG. 6 shows a clutch disk as the quick-closing means.

The apparatus according to the invention has a housing 1 with a funnel 2 for delivering the meat. Two pressure rollers 3 and 4 are rotatably supported in the housing 1, spaced slightly apart from one another and parallel to one another. Below the two pressure rollers 3 and 4 is a conveyor belt 5, which after the pressure treatment delivers the meat to an injector 6, in which curing, pickling or sousing brine is injected into the mean in a known manner. The structure and operation of an injector of this kind is well known and will therefore not be described in detail here.

In FIGS. 2–5, embodiments of the pressure rollers 3 and 4 are shown on an enlarged scale.

Figure 5:
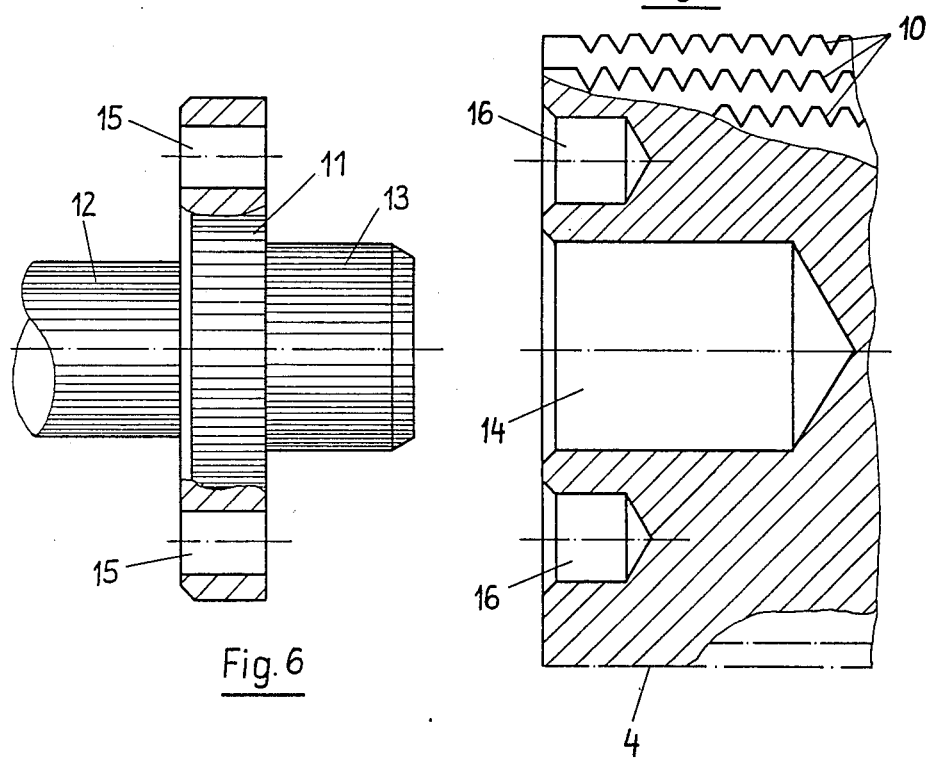
FIG. 5 is a fragmentary side view of the pressure roller of FIG. 4, partially in section.

The pressure roller shown in FIGS. 2 and 3 may be the pressure roller 3 of FIG. 1 and the pressure roller shown in FIGS. 4 and 5 may be the pressure roller 4 of FIG. 1.

The pressure roller 3 shown in FIGS. 2 and 3 has ten studs 7 distributed over the jacket surface and located parallel to the jacket lines. The space between the centers of adjacent studs is 36° in each instance. Between each two studs 7 is a groove 8, which is embodied in gabled, or double-pitch form as seen in cross section. A circumferential circle drawn through the tips of the gables 9 is smaller by only approximately 1–2 mm than a circumferential circle drawn through the studs 7. Given an outside diameter of the pressure roller 3 of 150 mm, the stud width is 15 mm and the height of the studs is 5 mm. Tests have shown that with the roller embodied in this manner, very good results are obtained. In particular, the low height of the studs and the small difference between the radii between the studs and the grooves located between them is sufficient. It had previously been believed that substantially higher studs had to be used in order to attain an appropriate increase in the surface area of the meat. In so doing, however, the above-described disadvantages arose. In particular, tearing and crushing of the meat that was to be treated occurred.

In FIGS. 4 and 5, the pressure roller 4 is shown, which instead of studs 7 extending parallel to the jacket lines has a multiplicity of pyramid-shaped protrusions 10 distributed over the circumference of the jacket surface. The studs of FIGS. 2 and 3, contrarily, have a rectangular shape in cross and the outer sides may have a radius corresponding to the outer diameter of the roller, if desired. In view of the slight width of the studs, however, a radial shape has practically no effect, given the roller diameter. Instead of a rectangular shape, however, a rhomboid shape may also be used, with the shorter side located toward the outside.

The pressure roller 4 having the pyramidal protrusions can be manufactured in a simple manner by cutting a trapezoidal thread into a roller initially having a smooth surface. If grooves are subsequently cut into the thread with a disk milling cutter, which is guided parallel to the jacket lines of the pressure roller, the result is the individual pyramid-shaped protrusions. The pressure rollers may be fabricated of any desired material. Generally, however, a plastic that is easy to clean will be used for this purpose.

To enable very quick and easy changing of the pressure rollers 3 and 4, they are supported in the housing 1 via a quick-closing means. On one end, the pressure rollers may be supported with a bearing trunnion—not shown—in a bearing, while on the other end they are supported in a coupler disk 11. The coupler disk has a drive trunnion 12 on one side, by means of which it is joined to a drive shaft—not shown—of a drive apparatus. On the other side of the coupler disk 11, there is a bearing trunnion 13, which can be fitted into a central bore 14 in the end face of the pressure roller 3 or 4. The coupler disk 11 is provided with two bores 15. Two bores 16 are likewise disposed in the end face of the pressure roller 3 or 4, and after the bearing trunnion 13 has been introduced into the central bore 14, and after a corresponding rotation of the pressure roller 3 or 4, these bores 16 are in alignment with the bores 15. If driver means such as bolts (not shown) are now inserted into the aligned bores 15 and 16, the result is the desired rotationally coupled quick connection of the pressure rollers 3 and 4 with the coupler disk.

Instead of a rectangular stud shape as shown in FIGS. 2 and 3, the studs may also be rounded or semicircular in cross section. In like manner, instead of pyramidal protrusions 10, protrusions in the form of buttons, stubs or the like may be provided. The semicircular shape of the studs is shown at bottom right in FIG. 2 in dashed lines, as part of a counter roller. At top left in the same figure, the stud of a counter roller is shown in dashed lines in a position such that it is apparent that the meat that is to be treated can yield, or escape, laterally in the gabled grooves during the process of pressure application.

I claim:

1. An apparatus for pressure-treating meat before the introduction of curing, pickling or sousing brine therein which comprises a housing supporting two opposed, rotatable pressure rollers; a plurality of grooves spaced around the circumference of at least one of said rollers each of which grooves extends substantially the length of said roller thereby providing a series of alternating grooves and studs around the circumference of said roller each of which extends substantially the length thereof, each of said grooves being formed by a bottom surface joining two side surfaces constituted by the sides of adjacent studs, the center of said bottom surface being higher than its junctions with said side surfaces thereby giving to said bottom surface a gabled configuration when said roller is viewed in transverse cross section, the radius of the circle passing through the centers of said bottom surfaces being about 0.5–5.0 mm shorter than the radius of the circle passing through the surfaces of said studs.

2. An apparatus according to claim 1 in which the difference in radii is about 1.0–2.0 mm.

3. An apparatus according to claim 1 in which there are 8–12 studs disposed parallel to the axis of said roller.

4. An apparatus according to claim 3 in which the relationship of the number of studs to the circumference of said circle passing through the surfaces of said studs is such that, for a circumference having a diameter of 150 mm, said roller has 10 studs.

5. An apparatus according to claim 4 in which the height of each stud is about 3–10 mm as measured from the junction of one of its sides with the bottom surface of an adjacent groove, to the surface of said stud.

6. An apparatus according to claim 1 in which the configuration of said studs when viewed in transverse cross section of said roller is selected from rectangular, rhomboidal, semicircular are rounded.

7. An apparatus according to claim 6 in which both rollers are provided with said studs and said grooves, the configuration of the studs on one roller when viewed in transverse cross section thereof being selected from rectangular and rhomboidal and the configuration of the studs on the other roller when viewed in transverse cross section thereof being selected from semicircular and rounded.

8. An apparatus according to claim 6 in which the other roller is provided on its circumferential surface with a plurality of pyramidal-shaped protuberances.

* * * * *